United States Patent [19] [11] Patent Number: 5,821,996
Kawamura et al. [45] Date of Patent: Oct. 13, 1998

[54] SOLID-SATE CAMERA WITH SOLID-STATE MEMORY FOR HOLDING CHARACTERISTIC CODE REPRESENTING CHARACTERISTIC OF AN INTERNAL CIRCUIT

[75] Inventors: Hideaki Kawamura, Kawasaki; Kan Takaiwa, Hachioji; Toshihiko Mimura; Yoshitaka Murata, both of Yokohama; Nobuaki Date, Kawasaki; Hiroyuki Horii; Takashi Suzuki, both of Yokohama; Seiichi Ozaki; Akihiko Tojo, both of Yokohama, all of Japan

[73] Assignee: Canon Kabushiki Kaisha, Tokyo, Japan

[21] Appl. No.: 445,750

[22] Filed: May 22, 1995

Related U.S. Application Data

[62] Division of Ser. No. 430,157, Apr. 27, 1995, which is a continuation of Ser. No. 97,610, Jul. 23, 1993, abandoned, which is a continuation of Ser. No. 426,215, Oct. 25, 1989, abandoned.

[30] Foreign Application Priority Data

Oct. 27, 1988 [JP] Japan .................................. 63-269558
Feb. 21, 1989 [JP] Japan .................................. 1-039343
Mar. 30, 1989 [JP] Japan .................................. 1-079587

[51] Int. Cl.[6] .................................................. H04N 5/76
[52] U.S. Cl. ........................................ 348/232; 348/233
[58] Field of Search ................................... 348/231–233; 358/906, 909.1; H04N 5/76, 5/77, 5/907

[56] References Cited

U.S. PATENT DOCUMENTS

| 4,489,351 | 12/1984 | d'Alayer de Costemore d'Arc .... 358/906 |
| 4,651,227 | 3/1987 | Yunoki et al. ........................... 358/335 |
| 4,827,347 | 5/1989 | Bell ........................................ 358/906 |
| 4,887,161 | 12/1989 | Watanabe et al. ....................... 358/906 |
| 4,943,867 | 7/1990 | Suetaka et al. ......................... 358/906 |
| 5,091,787 | 2/1992 | Watanabe et al. ....................... 358/906 |
| 5,093,731 | 3/1992 | Watanabe et al. ....................... 358/909 |

FOREIGN PATENT DOCUMENTS

| 55-78365 | 6/1980 | Japan .............................. G06F 13/00 |
| 56-4992 | 1/1981 | Japan .................................... 358/906 |
| 58-155586 | 9/1983 | Japan .................................... 358/906 |
| 62-78795 | 4/1987 | Japan .................................... 358/906 |
| 63-284987 | 11/1988 | Japan .............................. H04N 5/907 |
| 63-296483 | 12/1988 | Japan .............................. H04N 5/907 |
| 0176316 | 3/1989 | Japan ................................. G06F 3/08 |

Primary Examiner—Mark R. Powell
Assistant Examiner—John W. Miller
Attorney, Agent, or Firm—Fitzpatrick, Cella, Harper & Scinto

[57] ABSTRACT

A solid-state memory apparatus including a characteristic code holding device for holding a characteristic code representing characteristics of an internal circuit, a readout device for reading out the characteristic code held in the characteristic code holding device, and an output device for outputting the characteristic code read out by the readout device to an external device.

9 Claims, 10 Drawing Sheets

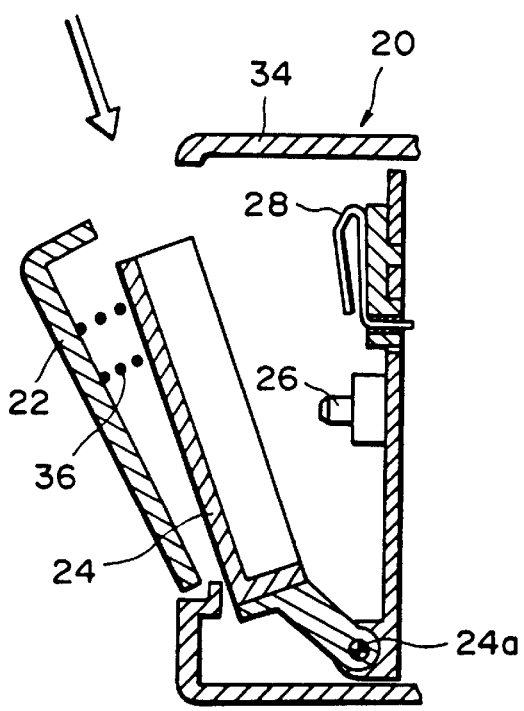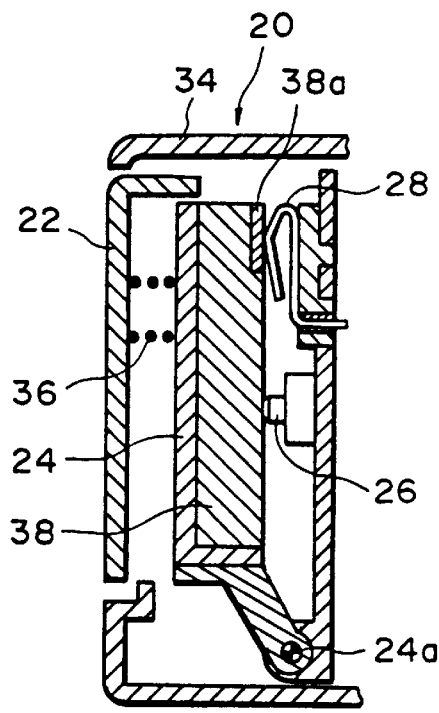
FIG. 3A
FIG. 3B

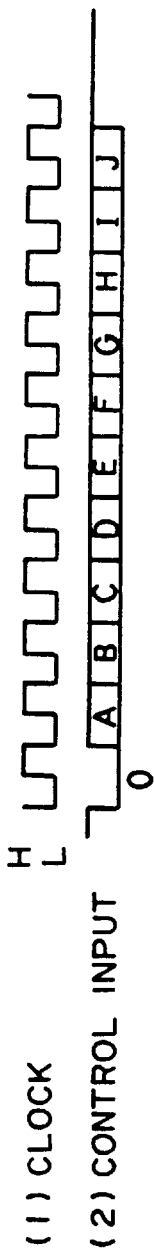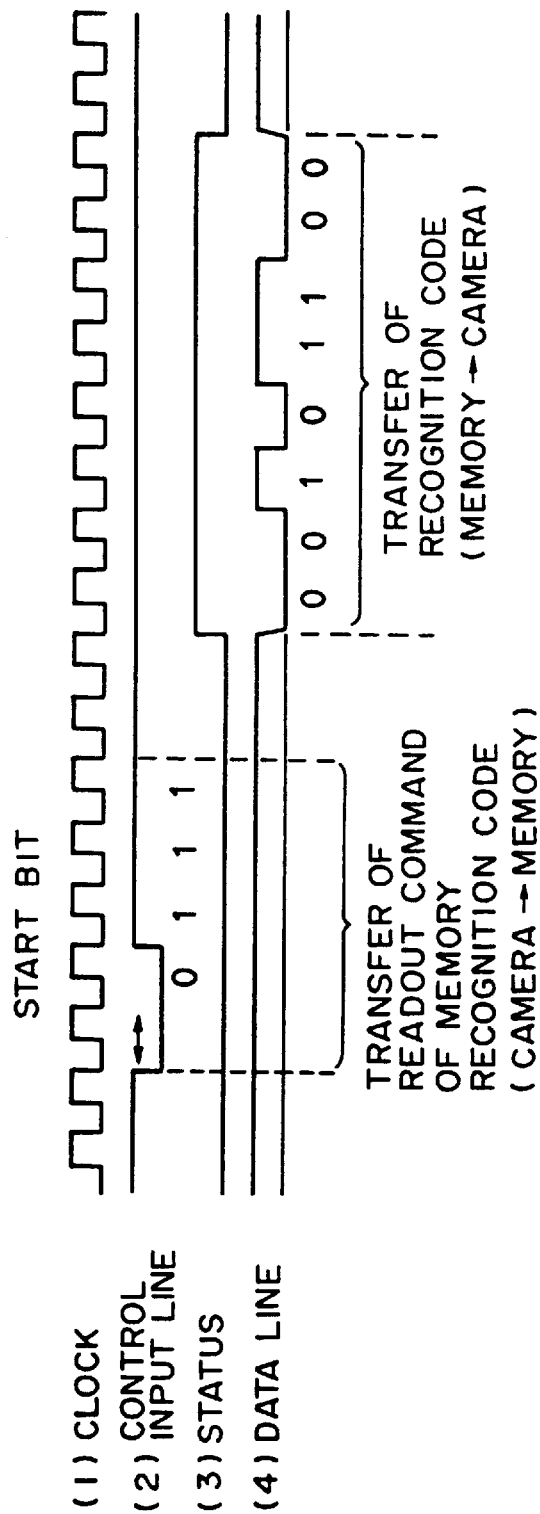

SOLID-SATE CAMERA WITH SOLID-STATE MEMORY FOR HOLDING CHARACTERISTIC CODE REPRESENTING CHARACTERISTIC OF AN INTERNAL CIRCUIT

This application is a division of application Ser. No. 08/430,157 filed Apr. 27, 1995, which is a continuation of application Ser. No. 08/097,610 filed Jul. 23, 1993, now abandoned, which is a continuation of application Ser. No. 07/426,215 filed Oct. 25, 1989, now abandoned.

BACKGROUND OF THE INVENTION

1. Field of the Invention

The present invention relates to a solid-state camera using a solid-state memory apparatus as a recording medium for a photographed image and the solid-state memory apparatus.

2. Related Background Art

An electronic still camera using a memory not requiring a movable mechanism for recording/reproduction of information (to be referred to as a solid-state camera hereinafter) has attracted attention as a successor of a silver chloride still camera and a video floppy electronic still camera. In an electronic still camera, instantaneous reproduction of a photographed image, image transfer, computer image processing, electronic image filing and the like can be easily performed by electronically processing image information. In the case of using a compact magnetic sheet called a video floppy as a recording medium, however, movable portions such as a rotating mechanism for the magnetic sheet and a head moving mechanism for positioning a magnetic head with the precision of several tens to hundreds of $\mu$m in terms of a track pitch are required, thereby increasing the manufacturing cost of a camera and limiting the environments in which it can be used and limiting its operation speed. These problems are similarly posed when an optical disk or optical magnetic disk is used as a recording medium.

The solid-state camera has been proposed as a camera capable of solving the above problems. FIG. 1 shows an arrangement of a conventional solid-state camera system. Referring to FIG. 1, a memory cartridge 12 as a solid-state memory apparatus for storing image information can be detached from a camera main body 10 of the solid-state camera. A reproducing apparatus 14 reproduces stored information in the memory cartridge 12. The memory cartridge 12 comprises, e.g., an IC memory device, a memory controller, and a backup power source therefor. As the IC memory device, an SRAM, a DRAM, an EPROM, an EEPROM, or the like is used. The memory cartridge 12 and the camera main body 10 are connected by using, e.g., a metal connector, a transmit coil, or a photocoupler. An image photographed by the camera main body 10 is stored in a predetermined format by the memory cartridge 12. By connecting the memory cartridge 12 to the reproducing apparatus 14 to reproduce the stored image, electronic image data can be transmitted from the reproducing apparatus to a TV monitor, a printer, a transmitter, a filing apparatus, and the like.

In the conventional solid-state camera having the above arrangement, however, since the memory cartridge 12 can be detached from the camera main body 10, communication between the memory cartridge 12 and the camera main body 10 must be perfect upon photographing. In addition, the memory cartridge 12 itself requires no circuit defects, and a sufficient capacity for the backup power source, or the like to function. If a user operates a release button without noticing such defects, he or she cannot perform a photographing operation because an image to be photographed is not recorded.

Furthermore, the camera main body 10 must include a power source for driving various signal processors and exposure control means such as a lens driving means and an aperture driving means. A user, therefore, must perform a maintenance operation for, e.g., checking the voltage of a power source battery of the camera main body 10 or replacing the battery before he or she uses the camera, resulting in a very cumbersome operation for the user. Even if the power source capacity of the camera main body 10 is increased, not only must this maintenance operation still be performed, but also the size of the cameral main body 10 is increased by the increase in voltage capacity.

Moreover, the write speed (or time) of the IC memory device in the memory cartridge 12 largely changes in accordance with the type of device. Therefore, as the memory capacity is increased, the difference between write times is increased.

If data transfer is not performed at a proper speed corresponding to the write speed, data writing may fail and data may be lost.

In order to spread the use of the solid-state camera and the solid-state memory apparatus as described above, the size, connecting pins, and the like of the solid-state memory apparatus such as the memory cartridge 12 must be standardized.

If, however, techniques for realizing a large capacity, a high speed, and low power consumption of the IC memory device of the memory cartridge 12 rapidly progress, standardization of the size may prevent use of advanced circuit devices.

SUMMARY OF THE INVENTION

It is an object of the present invention to solve the above problems.

More specifically, it is an object of the present invention to provide a solid-state camera capable of automatically checking whether photographing can be performed and performing a necessary display or warning.

It is another object of the present invention to provide a solid-state camera capable of automatically coping with different types of memory device of a solid-state memory apparatus.

It is still another object of the present invention to provide a solid-state memory apparatus for use in the above solid-state camera, which does not prevent an increase in memory capacity even when its size is standardized.

A solid-state camera according to an embodiment of the present invention comprises loading detecting means for detecting loading of detachable image storing means, checking means for checking a detection output from the loading detecting means and the loaded image storing means, and control means for performing control of each section which includes predetermined display control in accordance with a check result of the check means.

The above solid-state camera can automatically detect whether the image storing means can be used. Therefore, in accordance with a detection result, the necessary warning or any other display is performed, and control such as photographing prohibition is performed, thereby improving operability and feel of use.

A solid-state camera according to another embodiment of the present invention is an apparatus for recording information in a detachable solid-state memory apparatus, comprising detecting means for detecting specification information of a loaded solid-state memory apparatus, wherein the access timing of the solid-state memory apparatus is controlled in accordance with detection information of the detecting means.

Upon recording, the solid-state camera performs transfer to the solid-state memory apparatus at an access timing corresponding to a memory device of the solid-state memory apparatus. As a result, a solid-state memory apparatus using various memory devices can be utilized.

A solid-state memory apparatus according to still another embodiment of the present invention comprises characteristic code holding means for holding a characteristic code representing characteristics of an internal circuit, and reading means for reading the characteristic code held in the characteristic code holding means.

Even when a new device is used as the internal circuit device to increase the memory capacity or the speed of the camera, the above solid-state memory apparatus can recognize the new device in accordance with the characteristic code and smoothly perform a corresponding operation. As a result, the internal circuit can be easily expanded or changed. Therefore, as long as the camera can recognize internal elements of a device even if the outer dimensions of the device are kept unchanged, the most advanced device can always be optimally used as a memory pack.

The other objects and features of the present invention will become apparent from the following description and the accompanying drawings.

BRIEF DESCRIPTION OF THE DRAWINGS

FIG. 3A is a sectional view showing a state in which a cartridge insertion portion is open;

FIG. 3B is a sectional view showing a state in which a cartridge is inserted;

FIG. 11 is a timing chart of a command; and

FIG. 12 is a timing chart upon a recognition code read operation.

DETAILED DESCRIPTION OF THE PREFERRED EMBODIMENTS

Embodiments of the present invention will be described below with reference to the accompanying drawings.

Figure 1:
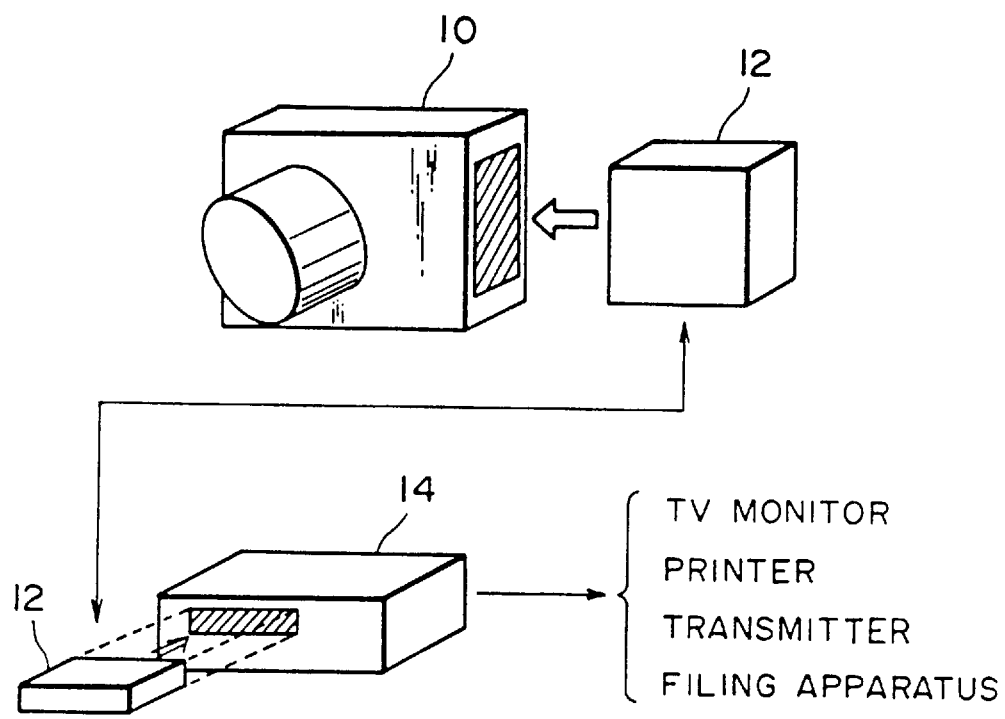
FIG. 1 is a perspective view showing an arrangement of a conventional solid-state camera system.
Figure 2:
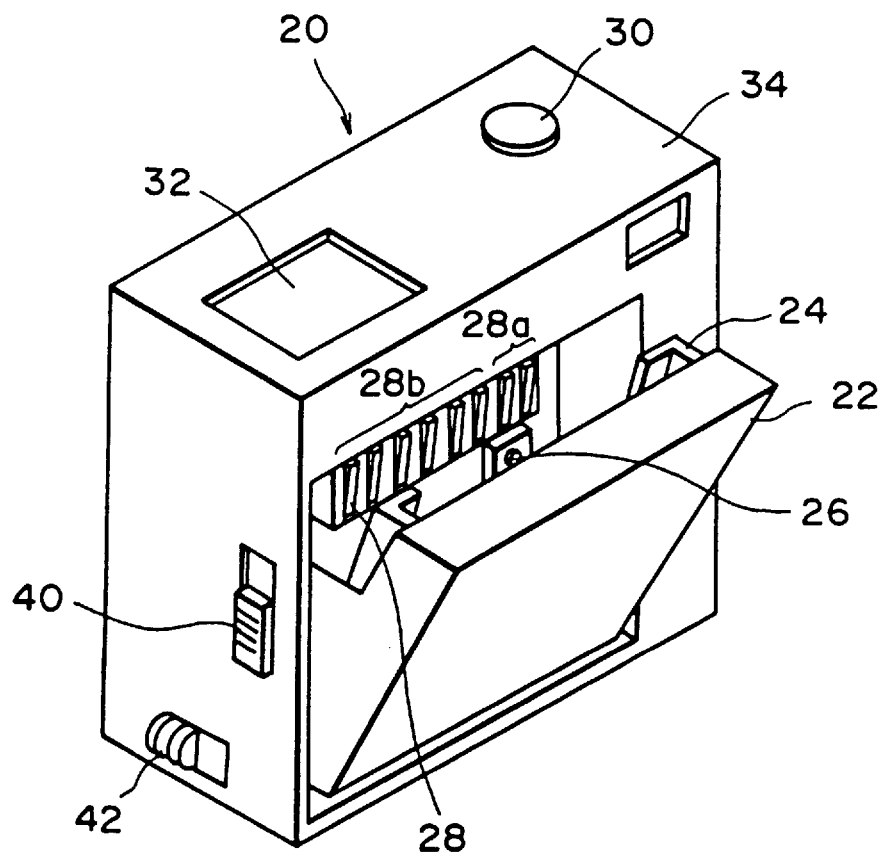
FIG. 2 is a perspective view showing the outer appearance of solid-state camera according to an embodiment of the present invention.

FIG. 2 is a perspective view showing the outer appearance of an embodiment according to the present invention, FIG. 3A is a sectional view showing a state in which an insertion portion for a memory cartridge as a solid-state memory apparatus is open, and FIG. 3B is a sectional view showing a state in which the memory cartridge is inserted in the insertion portion and the insertion portion is closed. In these drawings, a camera main body 20 comprises a cover 22, a cartridge holder 24 which can pivot about a pivot center 24a, a loading detection switch 26, electric contacts 28 for communicating with the memory cartridge, a release button 30, a liquid crystal display (LCD) device 32, a cover member 34, a cover biasing compression coil 36, a memory cartridge 38, memory contacts 38a of the memory cartridge 38, an eject button 40 for the memory cartridge 38, and a power switch 42 of the camera main body 20.

The operation of each section will be described below. In order to perform photographing, the eject button 40 is operated to set the open state shown in FIG. 3A, and the memory cartridge 38 is inserted in the holder 24 in a direction indicated by an arrow shown in FIG. 3A. If a barrier shutter for protecting a contact is provided for the memory cartridge 38, the barrier shutter is opened by opening means (not shown) during insertion. When the memory cartridge 38 reaches a predetermined position deep in the holder 24, the cartridge 38 is locked by a locking mechanism (not shown). Thereafter, by closing the cover 22, the memory contacts 38a are brought into contact with and are electrically connected to the electric contacts 28 of the camera body 20, as shown in FIG. 3B. After insertion is completed, the loading detection switch 26 is operated, and the state shown in FIG. 3B is held by a cover locking mechanism (not shown).

Figure 4:
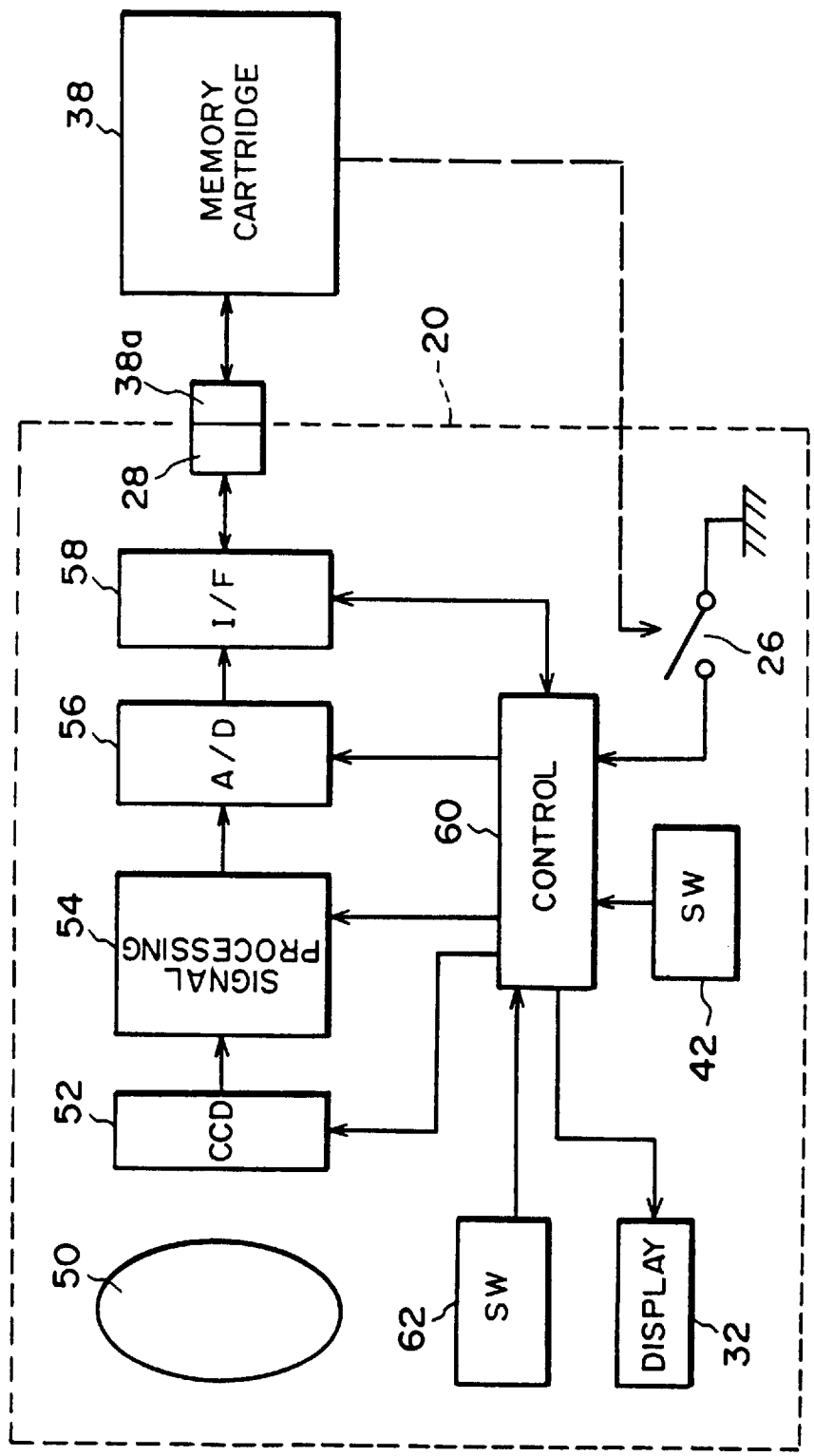
FIG. 4 is block diagram showing an electric circuit arrangement of the embodiment.

FIG. 4 is a block diagram showing an arrangement of electric circuits of this embodiment. In FIG. 4, the same reference numerals as in FIGS. 2, 3A, and 3B denote the same parts. Referring to FIG. 4, the camera main body 20 includes a photographic lens 50, a CCD image pickup device 52, a signal processor 54, an A/D converter 56, an interface circuit 58 with respect to the memory cartridge 38, a controller 60 constituted by a microcomputer for controlling the overall system, and a switch 62 for inputting various commands.

The image pickup device 52 converts an optical image of an object photographed by the photographic lens 50 into an electrical signal, and the signal processor 54 perform predetermined image signal processing. The A/D converter 56 digitizes an output from the signal processor 54. An output from the A/D converter 56 is supplied to and stored in the memory cartridge 38 via the interface circuit 58 and the contacts 28 and 38a.

Figure 5:
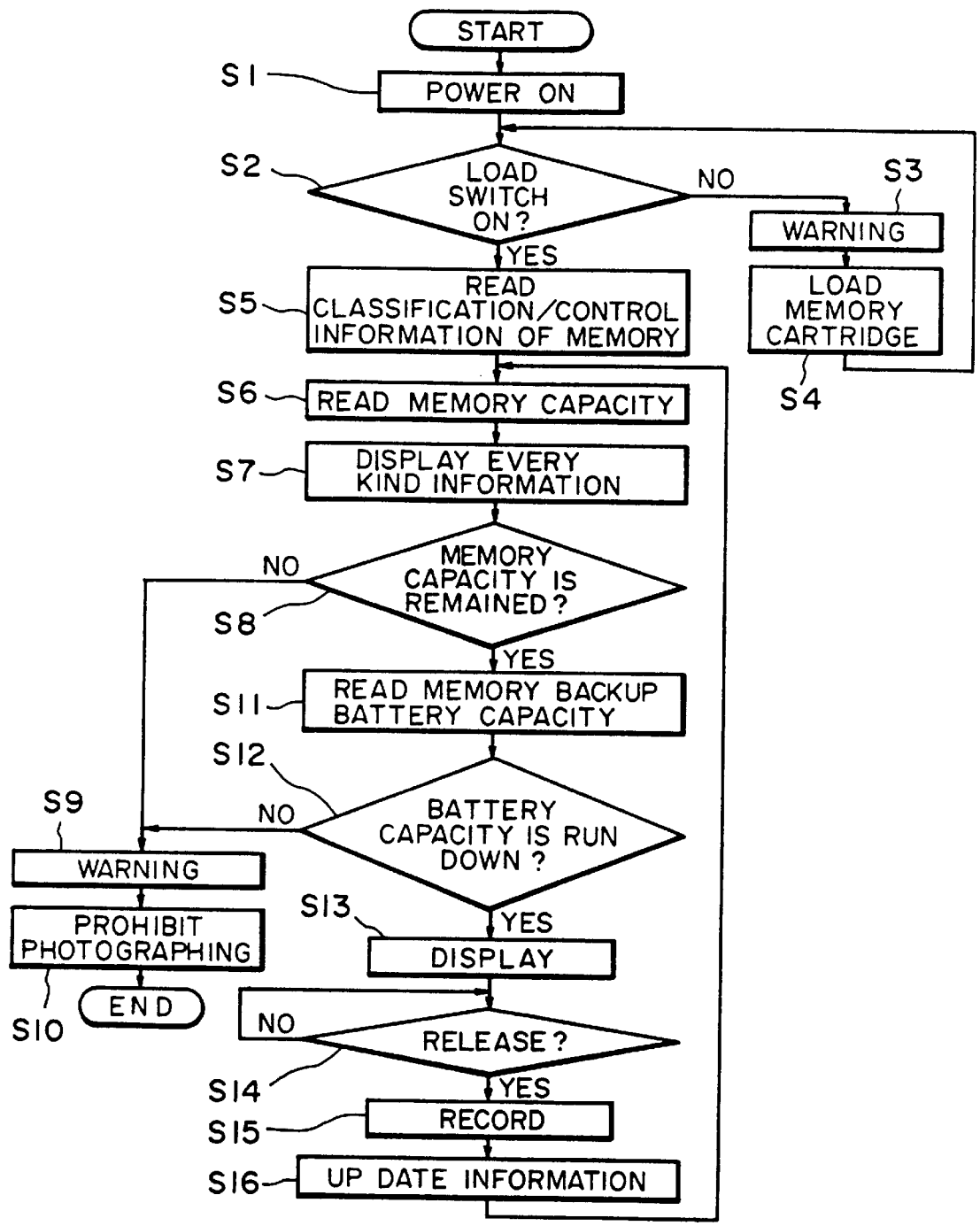
FIG. 5 is a flow chart for explaining the operation of the embodiment.
Figure 6:
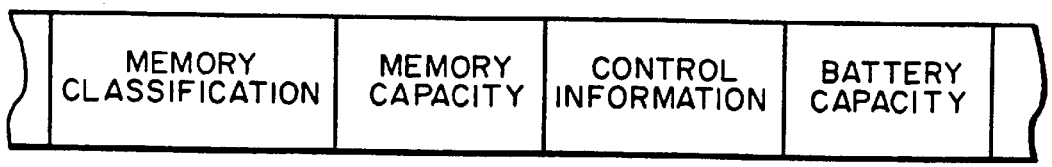
FIG. 6 is a schematic view showing a format of communication data.

FIG. 5 shows a control operation flow chart for performing checking in the above solid-state camera. Referring to FIG. 5, when a power source is switched on by the power switch 42 (S1), the controller 60 checks an open/close state of the loading detection switch 26 (S2). If unloading is detected, the controller 60 performs a warning operation by means of the display device 32 and/or a sound so as to cause the user to load the memory cartridge 38 (S4). If the memory cartridge 38 is already loaded, the controller 60 reads out various pieces of specification information stored beforehand in the loaded memory cartridge 38 (S5 and S6) and displays the readout information on the display device 32 (S7). FIG. 6 shows the format of communication data from the memory circuit 38 to the camera main body 20.

If no memory capacity remains, the controller 60 displays a warning indicating that photographing cannot be performed on the display device 32 (S9), and prohibits photographing (S10). If the necessary memory capacity remains, the controller 60 reads a remaining backup battery capacity of the memory cartridge 38 (S11). If the battery capacity is below a predetermined value, the controller 60 displays information indicating that photographing cannot be performed on the display device 32 and prohibits photographing (S9 and S10). If the battery capacity is over the predetermined value, the controller 60 displays information indicating that photographing can be performed (S13), waits for release (S14), and performs photographing/recording (i.e., writes an output from the image pickup device 52 in the memory cartridge 38) (S15). After recording (S15), the controller 60 updates information concerning the number of photographed frames, the memory remaining capacity, and the like (S16). The flow then returns to step S6, and the controller 60 checks the memory capacity and the backup battery capacity and waits for the next release.

The flow may be modified such that communication with the memory cartridge 38 is directly performed without checking the open/close state of the loading detection switch 26 immediately after the power source is switched on, and if the communication cannot be performed, the operator is warned of unloading or defective loading of the memory cartridge to prohibit photographing.

In the above embodiment, the switch 26 is separately provided to detect loading completion of the memory cartridge 38. Some of the electric contacts 28 of the camera main body 20, however, may be used to detect loading. In this case, two contacts 28a of a plurality of electric contacts 28 are used for loading detection, and the remaining contacts 28b are used for communication. One of the contacts 28 for loading detection is to be grounded. When loading of the memory cartridge 38 is completed, the memory contacts 38a are electrically connected to the contacts 28. In accordance with whether an electrical signal (voltage value or current value) from the contact 28a is lower or higher than a predetermined level, the controller 60 of the camera main body 20 checks whether loading is completed.

It is a matter of course that all the electric contacts 28 can be used for both loading detection and communication in such a manner that loading detection and data communication are performed at different timings. In this manner, the number of contacts 28 and 38a can be reduced.

As is apparent from the above description, according to this embodiment, whether an image to be photographed can be recorded in the memory cartridge is automatically checked. Therefore, photographing can be performed more reliably and more rapidly.

A solid-state camera according to another embodiment of the present invention will be described below with reference to FIGS. 7 to 9.

Figure 7:
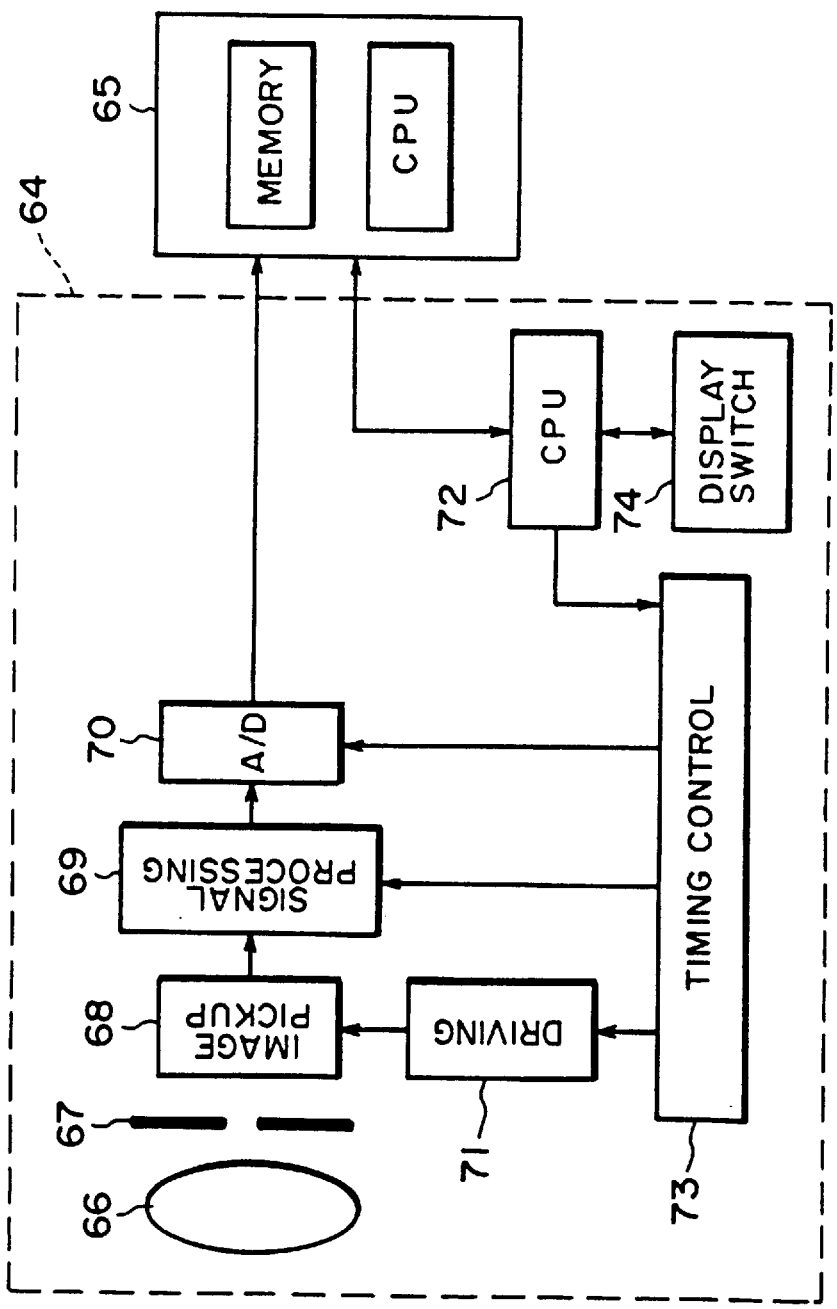
FIG. 7 is a block diagram showing an arrangement of another embodiment of the present invention.
Figure 8:
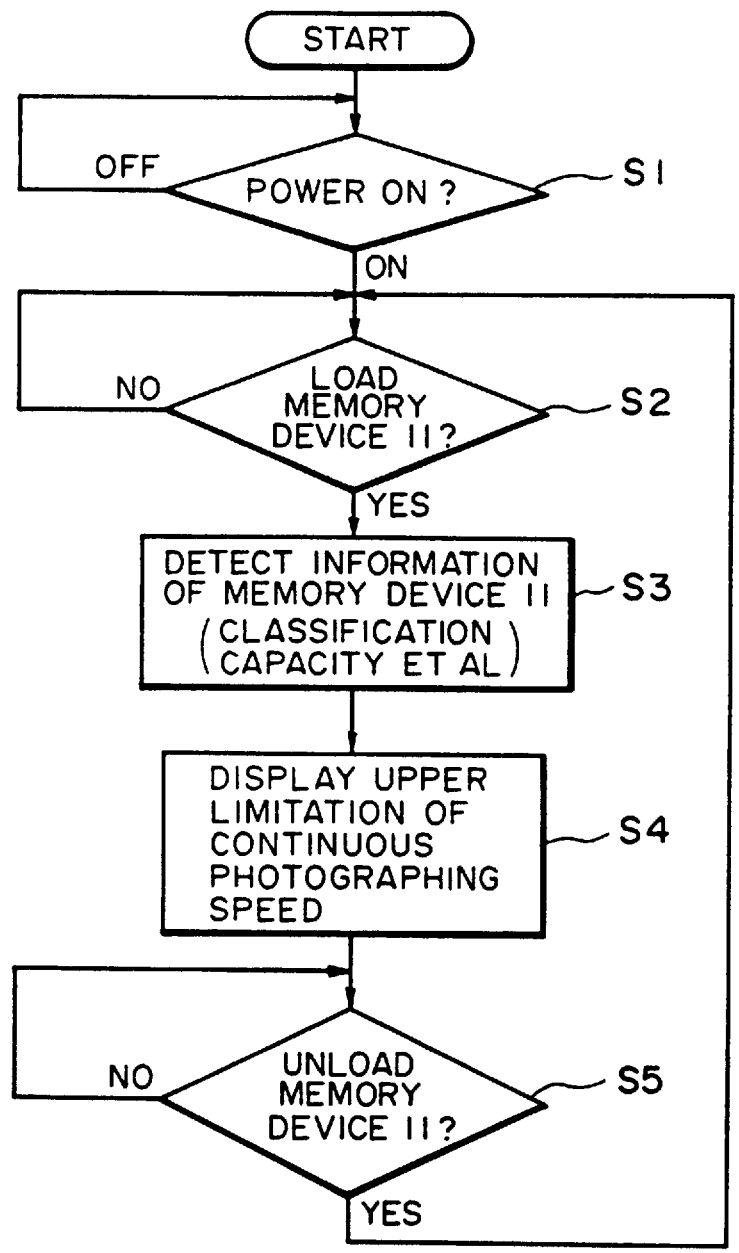
FIG. 8 is a flow chart for explaining the embodiment.

FIG. 7 is a block diagram showing an arrangement of the embodiment in which the present invention is applied to a solid-state camera using a solid-state memory apparatus similar to the memory cartridge 38 of the above embodiment as a still image recording medium. Referring to FIG. 7, a solid-state memory apparatus 65 comprising various IC memory devices and a CPU as a controller for controlling the IC memory devices can be detached from a camera main body 64. The solid-state memory apparatus 65 exchanges various information with the camera main body 64 via a predetermined bus line. The camera main body 64 comprises a photographic lens 66, a shutter 67, a solid-state image pickup device 68 such as a CCD, a signal processor 69, an A/D converter 70, a driver 71 for the image pickup device 68, a CPU 72 for controlling the overall system, a timing controller 73 for defining operation timings of the processor 69, the converter 70, and the driver 71 of the image pickup device 68, and a display/switch unit 74 including various switches and a display device.

The operation of FIG. 7 will be described below with reference to a flow chart shown in FIG. 8. When a power switch of the camera main body 64 is turned on (S1), loading of the solid-state memory apparatus 65 is waited (S2). The CPU 72 communicates with the loaded solid-state memory apparatus 65 and detects specification information (e.g., memory device classification, the transfer speed upper limit, and the remaining capacity shown in FIG. 6) of the solid-state memory apparatus 65 (S3). On the basis of this information, the CPU 72 determines operation speeds of the device 68, the processor 69, the converter 70, and the driver 71 and controls the timing controller 73.

When a user depresses a shutter switch of the display/switch unit 74, the shutter 67 is opened, and an output from the image pickup device 68 is transferred to and written in the solid-state memory apparatus 65 at the above timings via the signal processor 69 and the A/D converter 70.

Since a maximum continuous photographing speed is determined on the basis of the memory information obtained in step S3, the CPU 72 displays a possible maximum continuous photographing speed (S4), and monitors unloading of the solid-state memory apparatus 65 (S5).

Figure 9:
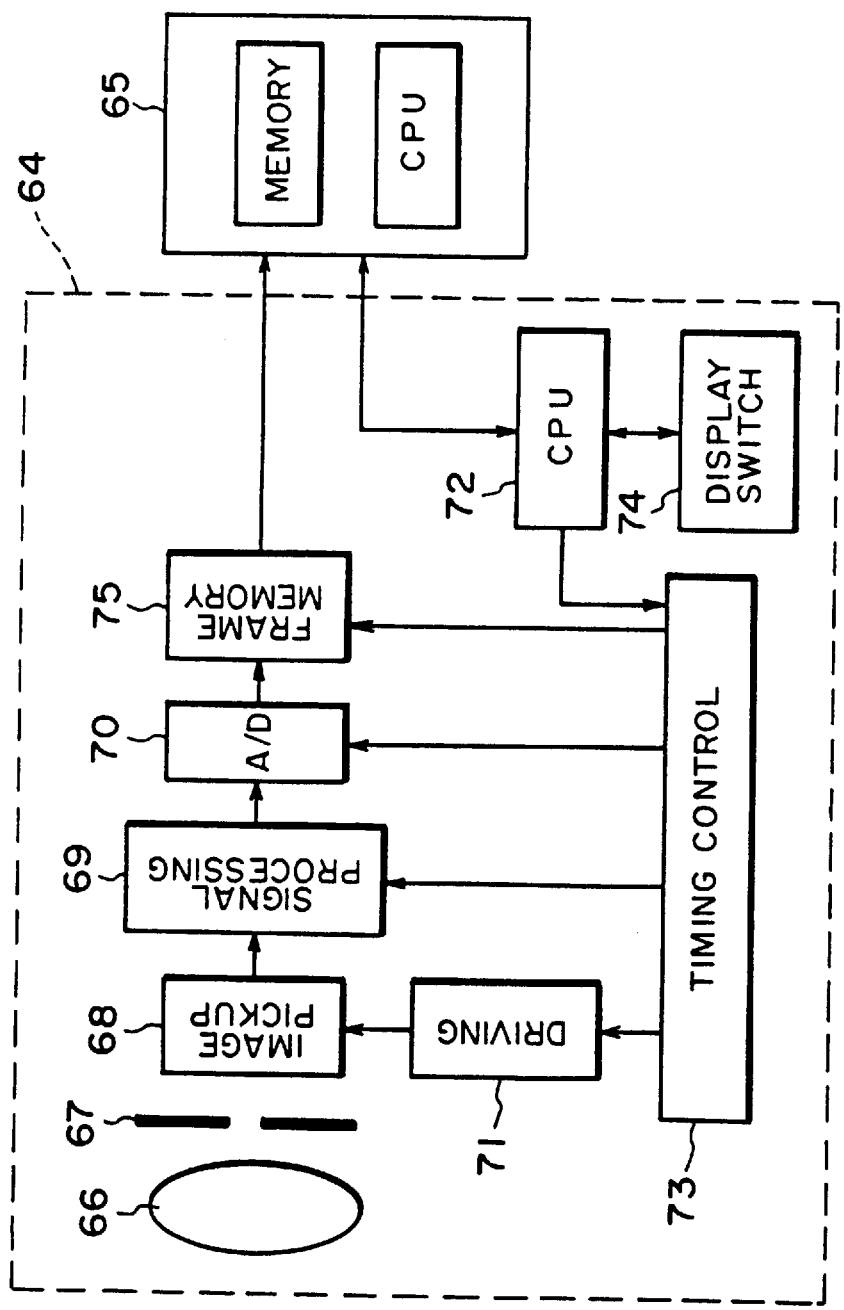
FIG. 9 is a block diagram showing an arrangement of still another embodiment of the present invention.

FIG. 9 is a block diagram showing an arrangement of still another embodiment of the present invention. In FIG. 9, the same reference numerals as in FIG. 7 denote the same parts.

In this embodiment, image data digitized by an A/D converter 70 is temporarily stored in a frame memory 75. The image data temporarily stored in the frame memory 75 is read out from the frame memory 75 at a speed corresponding to a transfer speed of a memory device of a solid-state memory 75 and written in the solid-state memory apparatus 65.

The above embodiment employs an arrangement in which when the solid-state memory 65 is loaded, the CPU 72 of the camera main body 64 inquires classification of a memory device used as the solid-state memory apparatus 65. The arrangement, however, may be made such that the above various types of information are mechanically set in the solid-state memory apparatus 65 and detecting means for detecting the mechanically set information may be provided for the camera main body 64. With this arrangement, the CPU need not communicate with the memory.

In this embodiment, the maximum continuous photographing speed of the solid-state camera is limited to a write enable speed of the solid-state memory apparatus 65 and displayed. Therefore, operability of the solid-state camera, especially its continuous photographing operability is improved.

In the above description, the solid-state camera has been exemplified. The present invention, however, can be generally applied to an apparatus for recording a certain kind of information in a detachable solid-state memory apparatus.

As is apparent from the above description, according to this embodiment, information can be reliably recorded even when solid-state memory apparatuses using various types of memory devices are replaced and used.

An embodiment of a solid-state memory apparatus according to the present invention will be described below with reference to FIGS. 10 to 12.

Note that the solid-state memory apparatus according to this embodiment is obtained by applying the present invention to the memory cartridge and the solid-state memory apparatus of the above embodiments.

Figure 10:
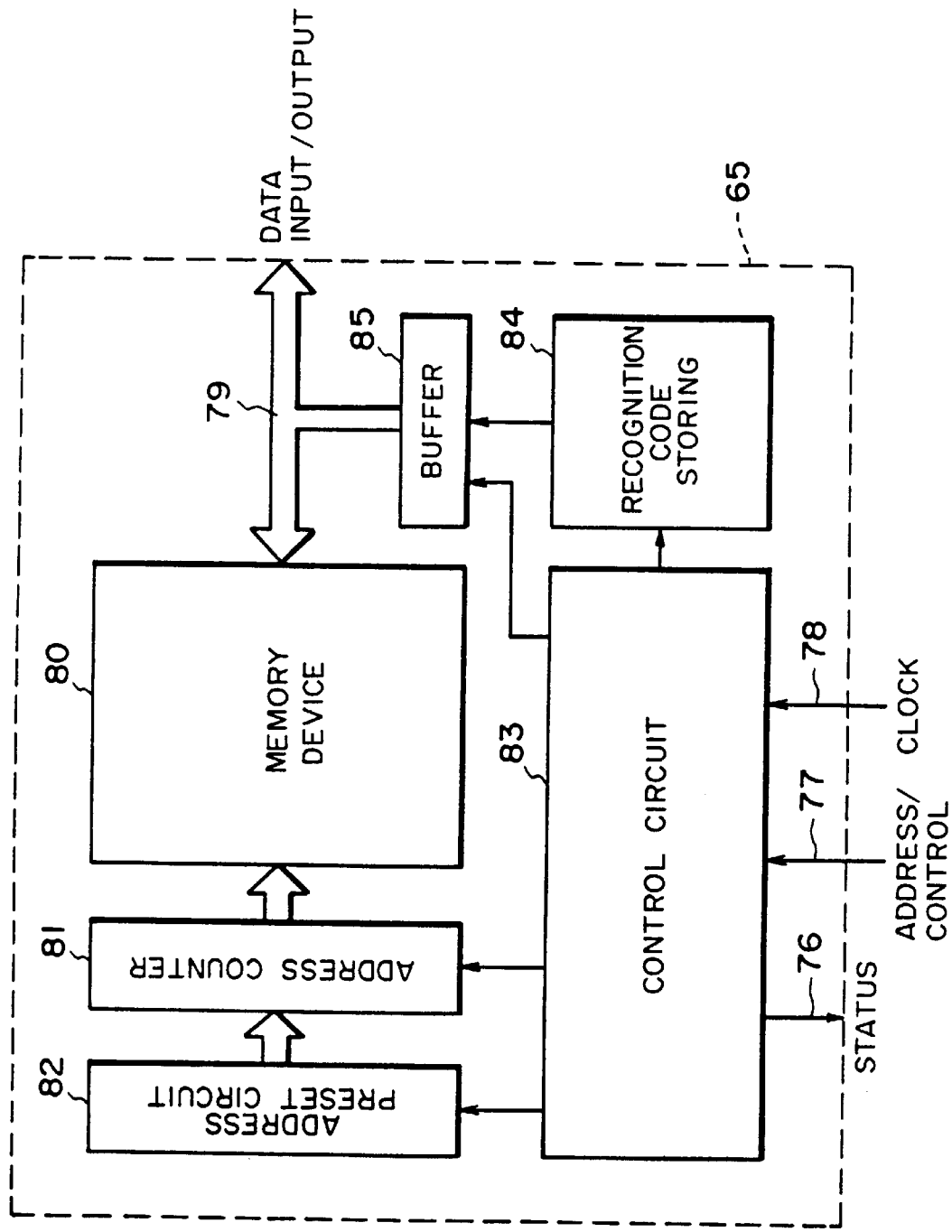
FIG. 10 is a block diagram showing an embodiment of a solid-state memory apparatus of the present invention.

FIG. 10 is a block diagram showing an arrangement of the embodiment of the present invention. Referring to FIG. 10, a solid-state memory apparatus 65 according to this embodiment includes a status output line 76, an address/control input line 77, a clock input line 78, and a data input/output line 79. In the case of a serial signal, the data input/output line 79 is constituted by one signal line. In the case of a parallel signal, however, the data input/output line is constituted by signal lines in the number corresponding to the number of parallel signals. The solid-state memory apparatus 65 also includes a memory device 80, an address counter 81, an address preset circuit 82, a controller 83, a recognition code storing circuit 84, and a buffer 85.

The input lines 77 and 78 and the input/output line 79 are connected to a solid-state camera via electric contacts as shown in FIG. 3.

When the camera sends a predetermined command to the address/control input line 77, an operation mode of the solid-state memory apparatus 65 is set. That is, a clock signal is supplied to the clock input line 78 and a binary signal is supplied to the address/control input line 77 at timings shown in FIG. 11.

A relationship between binary values at portions A, B, C, and D in FIG. 11 and the operation modes is shown in Table 1 below. Note that a maximum of 16 commands can be used by using four bits in this embodiment.

TABLE 1

| A | B | C | D | Operation Mode |
|---|---|---|---|---|
| 0 | 0 | 0 | 0 | Counter Clear |
| 0 | 0 | 0 | 1 | Counter Up |
| 0 | 0 | 1 | 0 | Counter Down |
| 0 | 0 | 1 | 1 | Counter Down/Load (Followed by E to J) |
| 0 | 1 | 0 | 0 | Memory Clear |
| 0 | 1 | 0 | 1 | Memory Readout |
| 0 | 1 | 1 | 0 | Memory Write |
| 0 | 1 | 1 | 1 | Recognition Code Readout |
| 1 | X | X | X | System Reservation |

In synchronism with a clock supplied from the clock input line 78, the controller 83 decodes a command from the address/control input line 77 and operates the respective sections by the designated operation mode.

For example, in this embodiment, by storing memory addresses corresponding to the number of photographs in the address preset circuit 82, image data can be randomly accessed by designating the number of a photograph. That is, when the number of photographs to be read is designated, the address preset circuit 82 loads its start address in the address counter 81, and the address counter 81 sequentially counts up. In this manner, writing or reading of a storage area corresponding to the designated number can be performed.

Similarly, a recognition code can be output from the recognition code storing circuit 84 to the camera main body. More specifically, when "0111" is supplied from the camera main body to the address/control input line 77, the controller 83 sends a command to the recognition code storing circuit 84 to output a stored recognition code. This recognition code is output to the camera main body via the output buffer 85 and the data input/output line 79. Note that the recognition code storing circuit 84 stores various types of specification information as shown in FIG. 6.

FIG. 12 is a timing chart for explaining the above operation.

A clock signal is normally supplied from the camera main body to the solid-state memory apparatus 65, and the internal circuit in the solid-state memory apparatus 65 operates in synchronism with this clock. A readout command "0111" of memory recognition code is supplied from the camera main body to the address/control input line 77 at the timing shown in FIG. 12. The first "0" is a start bit. The controller 83 interprets this command and sets a status bit at "H", thereby informing the camera main body that the data is effective. In synchronism with a clock, the controller 83 causes the recognition code storing circuit 84 to output storage data (in this embodiment, "00101100") to the data input/output line 79 via the buffer 85. A read-only memory or a combinational logic circuit, e.g., is used as the recognition code storing circuit 84.

When this recognition code may be determined to include information such as a memory capacity, a transfer rate, and an image size, its length is not limited to 8 bits.

In the above embodiment, the recognition code is read out by a command response scheme. An exclusive readout terminal, however, may be used to read out the code. In addition, in the above embodiment, data exchange is performed by four types of signal lines. Data exchange, however, may be performed by using a larger or smaller number of signal lines.

As is easily understood from the above description, according to the embodiments of the present invention, regardless of an outer shape or standardization of an interface, a new electronic device can be used to achieve a large capacity and a high speed.

What is claimed is:

1. A memory apparatus comprising:
   characteristic code holding means for holding a characteristic code representing characteristics of an internal circuit;
   readout means for reading out the characteristic code held in said characteristic code holding means; and
   output means for outputting the characteristic code read out by said readout means to an external device to adjust an operation condition of the external device according to the characteristics of said internal circuit.

2. An apparatus according to claim 1, wherein the characteristic code includes a memory capacity, a transfer speed and an image size.

3. An apparatus according to claim 1, wherein said characteristic code holding means is a memory device.

4. An apparatus according to claim 1, wherein said characteristic code holding means is a combinational logic circuit.

5. A memory apparatus comprising:
   a) a memory device for storing information;
   b) storing means for storing specification information of said memory device; and
   c) control means for controlling said memory device and said storing means, said control means reading out specification information from said storing means and outputting the specification information to an external device to adjust an operation condition of the external device according to the specification information of said memory device.

6. An apparatus according to claim 5, wherein the specification information includes a capacity of said memory device, a data transfer speed and an image size.

7. An apparatus according to claim 5, wherein said storing means is another memory device.

8. An apparatus according to claim 5, wherein said control means is controlled by another apparatus.

9. An apparatus according to claim 8, wherein said other apparatus is a solid-state camera.

* * * * *

UNITED STATES PATENT AND TRADEMARK OFFICE
CERTIFICATE OF CORRECTION

PATENT NO. : 5,821,996
DATED : October 13, 1998
INVENTOR(S) : HIDEAKI KAWAMURA, ET AL.

It is certified that error appears in the above-identified patent and that said Letters Patent is hereby corrected as shown below:

<u>Column 3</u>

Line 37, "of" (first occurrence) should read --of a--.
    Line 45, "flow chart" should read --flowchart--.
    Line 52, "flow chart" should read --flowchart--.

<u>Column 4</u>

Line 44, "perform" should read --performs--.

<u>Column 6</u>

Line 8, "waited" should read --awaited--.
    Line 49, "write" should read --write- --.

Signed and Sealed this

Twenty-fifth Day of May, 1999

Q. TODD DICKINSON

*Attest:*

*Attesting Officer*      *Acting Commissioner of Patents and Trademarks*